United States Patent

Satou et al.

[11] Patent Number: 6,074,023
[45] Date of Patent: Jun. 13, 2000

[54] GUIDE ROLLER ASSEMBLY FOR CRAWLER TYPE VEHICLES AND METHOD FOR FORMING GUIDE ROLLER

[75] Inventors: Fujio Satou, Tsukuba; Ken Ichiryu, Chiyoda-machi; Kiyoshi Tanaka, Mizukaido, all of Japan

[73] Assignee: Hitachi Construction Machinery Co., Ltd., Tokyo, Japan

[21] Appl. No.: 08/888,100

[22] Filed: Jul. 3, 1997

[30] Foreign Application Priority Data

Jul. 24, 1996 [JP] Japan ................................ 8-213067

[51] Int. Cl.7 ........................................... B62D 55/10
[52] U.S. Cl. .................... 305/116; 305/119; 305/137; 305/121; 305/138
[58] Field of Search ............... 305/119–124, 136–138, 305/137, 100, 116, 120–121

[56] References Cited

U.S. PATENT DOCUMENTS

| 2,080,744 | 5/1937 | Rogers | 305/116 |
|---|---|---|---|
| 2,355,743 | 8/1944 | Mueller . | |
| 2,393,993 | 2/1946 | Knox | 305/138 |
| 2,647,025 | 7/1953 | Deffenbaugh | 305/136 |
| 3,116,957 | 1/1964 | Fikse | 305/138 |
| 3,147,048 | 9/1964 | Johnson et al. | 305/136 |
| 3,603,650 | 9/1971 | Miller | 305/137 |
| 3,764,184 | 10/1973 | Orr et al. | 305/138 |
| 3,797,895 | 3/1974 | Tomizawa | 305/136 |
| 3,871,719 | 3/1975 | Boggs | 305/136 |
| 3,910,128 | 10/1975 | Boggs et al. | 305/136 |
| 3,989,314 | 11/1976 | Reinsma et al. | 305/137 |
| 4,176,887 | 12/1979 | Alpers et al. | 305/119 |
| 4,239,297 | 12/1980 | Livesay | 305/119 |
| 4,840,053 | 6/1989 | Nakamura . | |
| 4,890,892 | 1/1990 | Haslett | 305/137 |
| 5,669,680 | 9/1997 | Bertoni | 305/119 |
| 5,791,257 | 8/1998 | Konop | 305/116 |
| 5,829,849 | 11/1998 | Lawson | 305/193 |

FOREIGN PATENT DOCUMENTS

| 3836928 | 5/1990 | Germany . |
|---|---|---|
| 198784 | of 0000 | Japan . |
| 413487 | of 0000 | Japan . |
| 478086 | of 0000 | Japan . |
| 6452885 | of 0000 | Japan . |
| 667278 | of 0000 | Japan . |
| 2240944 | 8/1991 | United Kingdom . |

*Primary Examiner*—Mark T. Le
*Assistant Examiner*—Long Bao Nguyen
*Attorney, Agent, or Firm*—Antonelli, Terry, Stout & Kraus, LLP

[57] ABSTRACT

A guide roller assembly for use in a guide roller mechanism of a crawler type vehicle, including a support shaft fixedly provided on a truck frame and a guide roller rotatably mounted on the support shaft through bearings. The guide roller has an integral unitary body structure of a stepped cylindrical shape having a radially bulged portion formed integrally by plastic deformation in an axially intermediate portion between cylindrical end portions of a smaller diameter, and having a uniform wall thickness over the entire length of the guide roller. The guide roller is improved in strength and can realize a substantial cut in production cost.

6 Claims, 7 Drawing Sheets

GUIDE ROLLER ASSEMBLY FOR CRAWLER TYPE VEHICLES AND METHOD FOR FORMING GUIDE ROLLER

BACKGROUND OF THE INVENTION

1. Field of the Invention

This invention relates to a guide roller assembly to be rotatably mounted on a truck frame of a crawler type vehicle for guiding a crawler belt, and also to a method of forming a guide roller for the guide roller assembly.

2. Description of the Prior Art

Generally, crawler type vehicles such as hydraulic power shovels or cranes are largely constituted by a base carrier, and an upper rotary body which is rotatably mounted on top of the base carrier. In turn, the base carrier is largely constituted by a truck frame, an idler wheel and a drive sprocket which are located at each side of the truck frame in spaced front and rear positions, and an endless crawler belt which is passed between and around the drive sprocket and the idler wheel. Provided also at each side of the truck frame, between the drive sprocket and idler wheel, is a crawler belt guide roller mechanism having a plural number of guide rollers for guiding movements of the crawler belt.

For example, as disclosed in Japanese Laid-Open Utility Model Application 1-98784, a crawler belt guide roller mechanism of this sort usually includes a truck frame, a support shaft which is fixedly supported on the truck frame, and a guide roller which is rotatably mounted on the circumference of the support shaft through a pair of bearings. Formed in an axially intermediate portion of the guide roller is a space which is filled with a lubricant oil to serve as an oil reservoir. The lubricant oil in the oil reservoir space, which is sealed by seal members at its opposite axial ends, is supplied to sliding surfaces of the support shaft and bearings for lubrication thereof.

According to the prior art, the guide rollers of this sort are normally of the so-called split type which consists of a pair of roller halves which are arranged symmetrically relative to an axial split plane. The roller halves are separately formed by hot forging, and joined together by welding axially intermediate portions.

The guide rollers of this sort are usually formed through a process which includes at least a heating step of heating the material for the roller halves to a high temperature, a forging step of press-forging the heated material with use of a die, a mechanical machining step of machining to shape the forged bodies of roller halves and forming joint portions on each one of the roller halves, and a welding step of welding the joint portions of the machined roller halves together to form the guide rollers.

In this manner, the guide roller forming process requires a large number of steps such as; heating, forging, mechanical machining and welding as mentioned above, which are necessarily reflected by a high production cost of the guide rollers mainly due to high equipment costs for the heating and forging steps.

In addition, the guide rollers, which are formed by welding together roller halves as described above, have an inherent problem that cracks are likely to develop in the welded joint portions of the guide rollers to make it difficult to operate the guide roller mechanism stably over a long period of time, for example, especially in the case of a crawler type vehicle which is driven repeatedly on severely rough and bumpy grounds over a long period of time.

SUMMARY OF THE INVENTION

In view of the above-mentioned problems of the prior art, it is an object of the present invention to provide a crawler belt guide roller assembly which can reduce the production cost of guide rollers while increasing the strength of guide rollers to ensure stable operations over an extended period of time, and a method of forming bodies of guide rollers of this sort.

In accordance with the present invention, the above-stated objective is achieved by the provision of a guide roller assembly for use in a guide roller mechanism provided on a truck frame of a crawler type vehicle for guiding a crawler belt through a number of guide rollers, the guide roller assembly employing a guide roller having a unitary body structure of a stepped cylindrical shape with a radially bulged portion formed integrally in an axially intermediate portion of the guide roller through plastic deformation.

According to the present invention, by employing a guide roller consisting of a unitary structure of stepped cylindrical shape as described above, the process for forming guide rollers can be simplified to a considerable degree as compared with the conventional processes, in which each guide roller is fabricated by firstly forming and machining roller halves and then joining and welding together the roller halves into a complete form, thereby eliminating the mechanical machining and welding operations which have been necessarily required for forming and welding joint portions of roller halves. Besides, the guide roller according to the present invention are uniform in strength and free of any localized weak spots as usually found in welded joint portions in the case of guide rollers which are made up of a plural number of welded parts or segments.

In this instance, preferably the guide roller is formed substantially in uniform thickness along its entire length.

Further, according to the present invention, there is provided a guide roller assembly for use in a guide roller mechanism of a crawler type vehicle, having a truck frame, a support shaft fixedly mounted on the truck frame, and a guide roller rotatably fitted on the circumference of the support shaft through a pair of bearings to guide movements of a running crawler belt, characterized in that the guide roller is provided with an integral unitary body of a stepped cylindrical shape including a pair of cylindrical end portions formed in axially opposite end portions and accommodating bearings on the inner peripheral side thereof, and a radially bulged center portion formed integrally in an axially intermediate portion between the cylindrical end portions.

With the arrangements just described, as the guide roller is turned about the support shaft, the bulged center portion of the guide roller is held in sliding engagement with the running crawler belt to guide the movements of the crawler belt along the truck frame. Since the guide roller consists of an integral unitary body structure containing the cylindrical end portions and the radially bulged center portion as integral parts thereof, it becomes possible to reduce the production cost and to improve the strength of the guide roller.

In this instance, it is preferable that the guide roller be formed substantially in uniform wall thickness throughout its body structure including the cylindrical end portions and the radially bulged center portion.

Further, according to the present invention, the bearings are each constituted by a sleeve-like spacer member which is fitted in the inner periphery of a cylindrical end portion of the guide roller, and a sleeve-like bush which is fitted between and in sliding contact with the inner periphery of the spacer member and the outer periphery of the support shaft. These arrangements of the bearings contribute to the reinforcement of the cylindrical end portions of the guide roller.

Furthermore, according to the present invention, a sleeve-like reinforcing member is fitted on the outer periphery of each cylindrical end portion of the guide roller. In order to protect the cylindrical end portions of the guide roller, the respective reinforcing members are constantly held in sliding contact with the crawler belt.

Moreover, according to the present invention, the radially bulged center portion of the guide roller is further implemented in strength by the provision of an indented reinforcing groove formed annularly on and around the entire outer periphery of the bulged center portion.

On the other hand, according to the present invention, there is also provided a method for forming a guide roller consisting of an integral unitary structure of a stepped cylindrical shape having a radially bulged portion formed integrally between cylindrical end portions of a smaller diameter, the method essentially comprising the steps of: cutting a tubular structural steel material into a predetermined unit length; and applying a high pressure to interior surfaces of the tubular structural steel material while pressing the tubular material axially from the opposite ends thereof.

According to the method just described, a radially bulged portion is formed in an axially intermediate portion of the tubular structural steel material through plastic deformation by the application of a high pressure on interior surfaces of the tubular steel material while pressing the material axially from the opposite ends thereof. By this method, there can be obtained a unitary guide roller having a radially bulged portion integrally formed in an axially intermediate portion between the cylindrical end portions of a smaller diameter.

Further, according to the present invention, there is also provided a method for manufacturing a guide roller consisting of a unitary body structure of a stepped cylindrical shape having a radially bulged portion formed integrally in an axially intermediate portion between cylindrical end portions of a smaller diameter, the method essentially comprising the steps of: cutting a tubular structural steel material into a predetermined unit length; clamping the tubular material in a die having a cylindrical cavity corresponding to a radially bulged portion to be formed on the guide roller; and applying a high pressure on interior surfaces of the tubular material while pressing the tubular material axially from the opposite ends thereof, causing an axially intermediate portion of the tubular material to bulge out into the die cavity through plastic deformation to form a radially bulged portion on the tubular material.

According to the method just described, while clamping a tubular structural steel material of a predetermined unit length in a die and at the same time pressing forces the tubular material axially at the opposite ends thereof, a high pressure is introduced into the tubular material, causing an axially intermediate portion of the tubular material to bulge out into the die cavity through plastic deformation to form on the tubular material a radially bulged portion of a predetermined shape corresponding to the shape of the die cavity.

BRIEF DESCRIPTION OF THE DRAWINGS

The above and other objects, features and advantages of the present invention will become apparent from the following description, taken in conjunction with the accompanying drawings which show by way of example some preferred embodiments of the invention and in which.

DETAILED DESCRIPTION OF PREFERRED EMBODIMENTS

Hereafter, the present invention is described more particularly by way of its preferred embodiments with reference to FIGS. 1 through 9 of the accompanying drawings.

Figure 1:
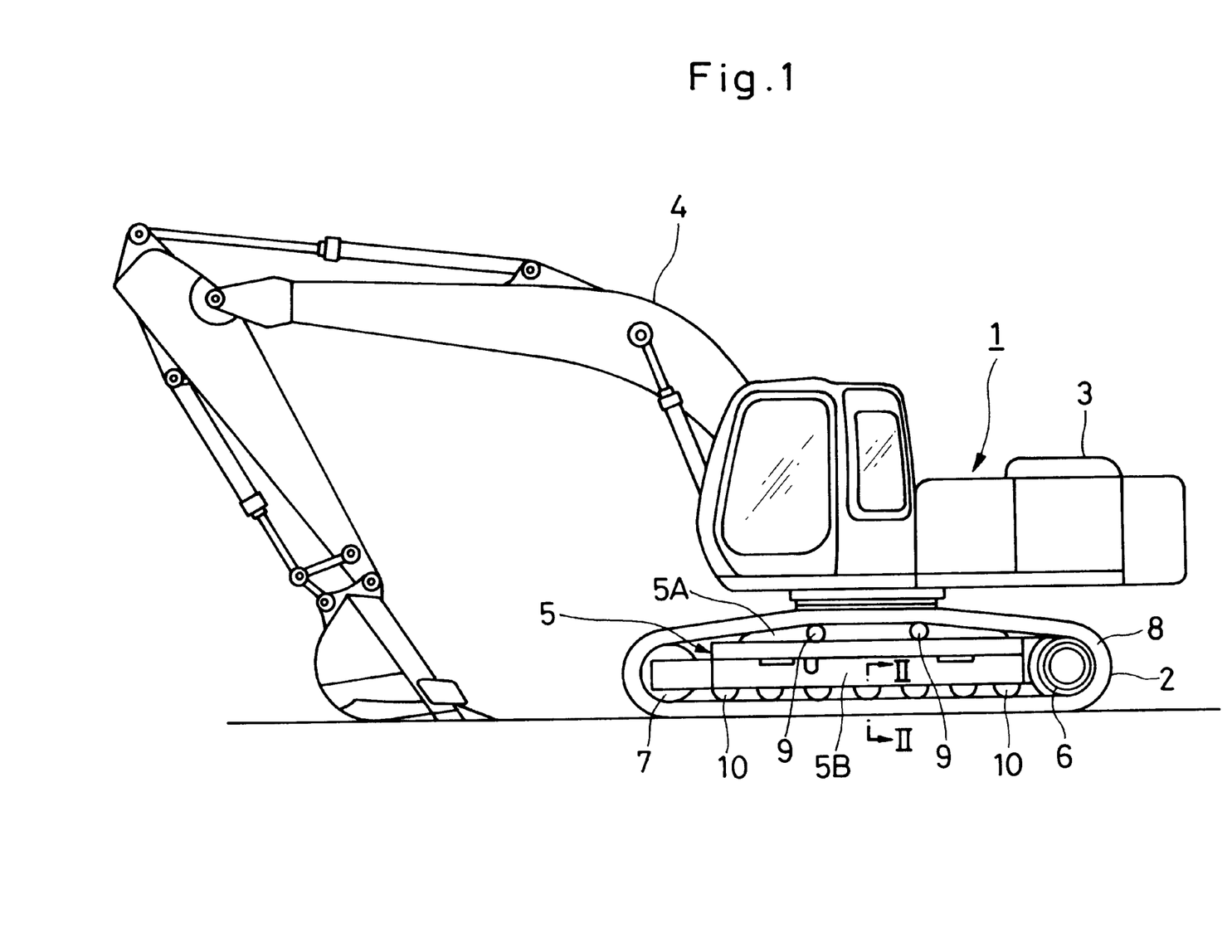
FIG. 1 is a schematic view of a hydraulic power shovel incorporating in its crawler belt guide mechanism a guide roller assembly which has been adopted as a first embodiment of the present invention.
Figure 2:
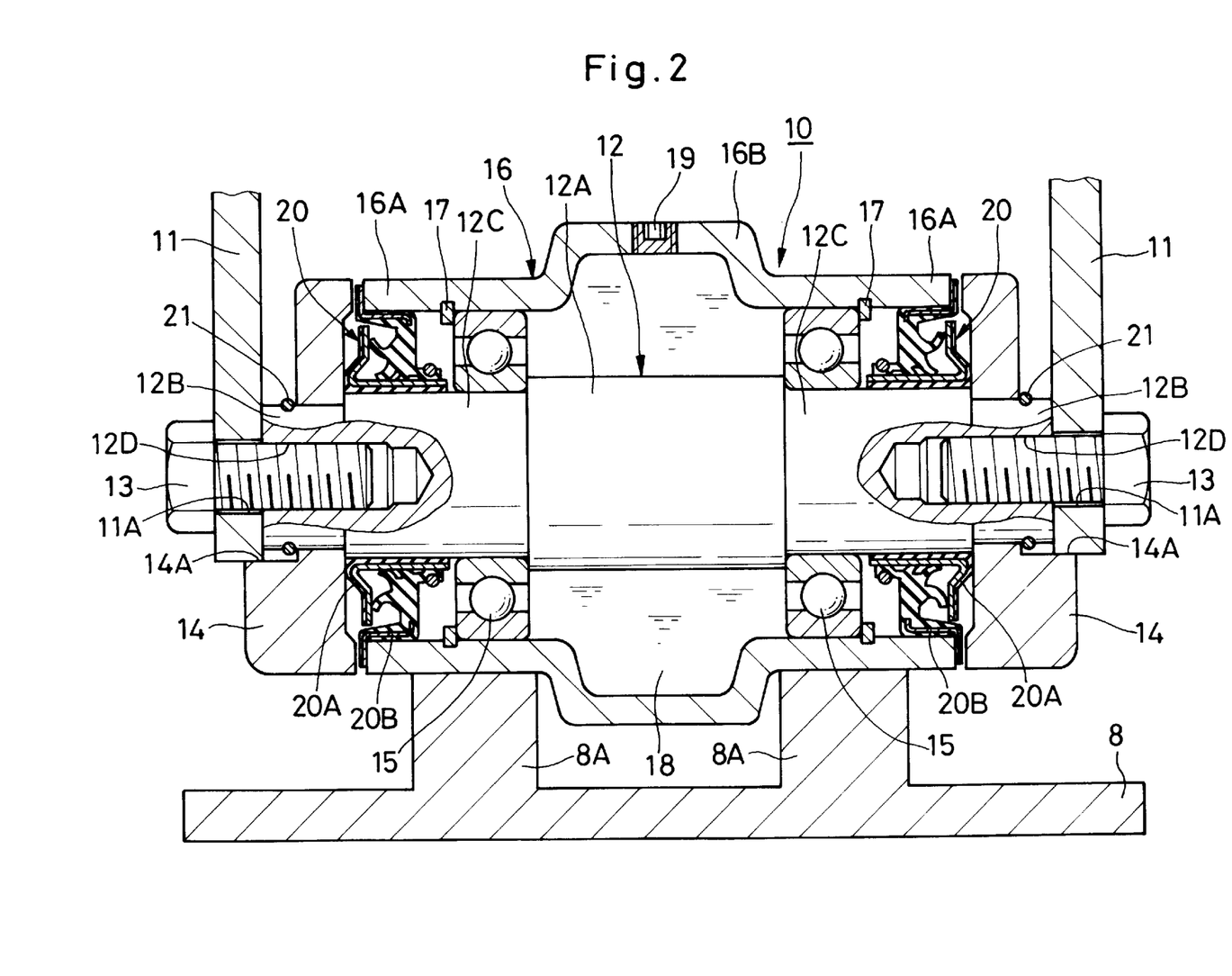
FIG. 2 is a vertical sectional view of a lower guide roller assembly, taken in the direction of arrows II—II of FIG. 1.

Referring first to FIGS. 1 and 2, there is shown a first embodiment of the present invention, in which indicated at 1 is a hydraulic power shovel typical of crawler type vehicles to which the guide roller assembly of this embodiment can be applied. The hydraulic power shovel 1 is largely constituted by a base carrier 2, an upper rotary body 3 which is rotatably mounted on the base carrier 2, and a working mechanism 4 which is vertically pivotally mounted on the front side of the upper rotary body 3 for carrying out excavations or other ground-working jobs.

Denoted at 5 is a truck frame of the base carrier 2, including a center frame 5A, and a pair of side frames 5B extended in forward and rearward directions at the opposite lateral sides of the center frame 5A (only one side frame is shown in the drawings). A drive sprocket 6 and an idler wheel 7 are provided at the opposite ends of each side frame 5B.

Designated at 8 is a crawler belt which is lapped between and around the drive sprocket 6 and idler wheel 7. As the drive sprocket 6 is driven from a rotational drive, the crawler belt 8 is put in crawling motion around the idler wheel 7 and upper and lower guide roller mechanisms, which will be described hereinafter, to put the base carrier 2 in travel.

Indicated at 9 are a couple of guide roller assemblies of upper guide roller mechanism, which are rotatably mounted on the upper side of the side frame 5B to support the crawler belt 8 from beneath, preventing the crawler belt 8 from contacting the side frame 5B.

Indicated at 10 are a plural number of guide roller assemblies of lower guide roller mechanism, which are rotatably mounted in series on the lower side of the side frame 5B to guide the crawler belt 8 along the side frame 5B together with the drive sprocket 6 and the idler wheel 7.

Firstly, the description is directed to the lower guide roller assembly 10 of FIG. 2, which embodies the present invention.

In that figure, denoted at 11 are left and right support brackets which constitute a part of the truck frame and which are provided on the lower side of the side frame 5B to support a guide roller 16 rotatably therebetween in the manner as will be described hereinafter. These support brackets 11 are provided with bolt holes 11A to receive mounting bolts 13 which will also be described hereinafter.

Indicated at 12 is a support shaft which is fixed between the above-mentioned left and right support brackets 11, the support shaft 12 having a larger diameter portion 12A provided in an axially intermediate portion, smaller diameter portions 12B provided in axially opposite end portions, and bearing fitting portions 12C provided between the smaller diameter portions 12B and the larger diameter portion 12A to support thereon ball bearings 15 as will be described hereinafter. Axial screw holes 12D are tapped in the opposite end faces of the support shaft 12. The support shaft 12 is fixed between and on the support bracket 11 by threading mounting bolts 13 into the screw holes 12D through the bolt holes 11A of the respective support brackets 11.

Denoted at 14 are support collars which are fitted on the small diameter portions 12B of the support shaft 12 in positions on the inner side of the support brackets 11. The lower end of each support collar 14 is projected outward or toward the support bracket 11 to form a load bearing portion 14A which supports the lower end of the support bracket 11. Accordingly, the load of the hydraulic shovel 1 is transmitted to the support shaft 12 through the respective support brackets 11 and support collars 14.

The ball bearings 15 have the respective inner rings forcibly fitted on the baring fitting portions 12C of the support shaft 12, and are retained in position by and between a stepped end face of the large diameter portion 12A of the support shaft 12 and a stopper ring 17 which will be described after. Outer rings of the ball bearings 15 are fitted on the inner peripheries of cylindrical end portions 16A of a guide roller 16 by press-in fitting.

The guide roller 16 is rotatably mounted on and between the left and right support brackets 11 through the ball bearings 15. The guide roller 16 is provided with a couple of cylindrical end portions 16A which are located at its opposite axial ends, and a radially bulged center portion 16B which is formed integrally between the two cylindrical end portions 16A. In this instance, the guide roller 16 is formed out of a tubular structural steel material, for example, a carbon steel tube for machine structure (STKM steel material), tube of structural manganese steel with specified hardenability bands (SMn steel material), carbon steel tube for machine structure (e.g., S45C, S40C and S35C) etc. The guide roller 16 which consists of one integral structure is formed out of a tubular structural steel material of this sort by a bulging operation, in which the tubular steel material is formed into a stepped cylindrical shape which is substantially uniform in thickness in the longitudinal direction thereof.

The guide roller 16 is rotatably supported on the support shaft 12 through the ball bearings 15 which have the respective outer rings fitted in the inner peripheries of the cylindrical end portions 16A of the guide roller 16. The ball bearings 15 are retained in position and their axial dislodgment is securely prevented by the above-mentioned stopper rings 17 which are also fitted in the inner peripheries of the cylindrical end portions 16A.

In this instance, the cylindrical end portions 16A of the guide roller 16 are abutted against ridges 8A which are projected on the inner side of the crawler belt 8, and the radially bulged center portion 16B is engaged between the ridges 8A to prevent dislocation of the crawler belt 8 off the guide roller 16. Further, the ball bearings 15 are lubricated with a lubricant oil which is stored in an oil reservoir 18, which is formed between the radially bulged center portion 16B of the guide roller 16 and the support shaft 12. The oil reservoir 18 is closed by a closure plug 19.

Indicated at 20 are seal members which are provided at the opposite ends of the guide roller 16 in association with the left and right support collars 14. These seal members 20 are each constituted by a stationary seal 20A which is fitted on the outer periphery of the bearing fitting portion 12C of the support shaft 12, and a rotary seal 20B which is forcibly fitted in the inner periphery of the cylindrical end portion 16A of the guide roller 16. The rotary seal 20B of each seal member 20 is provided with a resilient lip portion which is constantly held in sliding engagement with the stationary seal 20A to prevent leakage of the lubricant oil in the oil reservoir 18 through the opposite ends of the guide roller 16.

Designated at 21 are stop rings which are fitted on the smaller diameter portions 12B of the support shaft 12. These stop rings 21 serve to determine axial positions of the support collars 14 on the smaller diameter portions 12B.

According to the this embodiment of the invention, with the arrangements as described above, when the base carrier 2 of the vehicle is put in travel, the guide roller 16 of each lower guide roller assembly 10 is rotated about the support shaft 12 to run on and along the ridges 8A of the crawler belt 8 with its radially bulged center portion 16B in engagement between c the ridges 8A of the crawler belt 8.

In this case, the weight of the power shovel 1 is constantly exerted on the guide roller 16 which consists of an integral unitary structure of a stepped cylindrical shape. Therefore, the guide roller 16 of this embodiment is free of partial weak spots, for example, such weak spots as are usually found in welded joint portions in the case of the conventional split type guide roller, which are formed by joining or welding together a plural number of separately formed parts. Accordingly, it becomes possible to lessen cracking damages to the guide roller 16 and to guarantee stable operations of the lower guide roller assembly 10 over a prolonged period of time, for example, even in a case where the power shovel 1 is operated on rough and bumpy grounds over a long period of time.

Further, the radially bulged center portion 16B, which is formed in an intermediate portion in the axial direction of the guide roller 16, contributes to implement the strength of the guide roller 16 as a whole, permitting to reduce the wall thickness of the guide roller 16. As a consequence, it becomes possible to provide the ball bearings 15 between the support shaft 12 and the respective cylindrical end portions 16A of the guide roller 16, which can improve the rotationability of the guide roller 16 to a marked degree, for example, as compared with those cases where only bushes are interposed between the guide roller and support shaft.

Moreover, thanks to the reduction in wall thickness, the weight of the guide roller 16 can be reduced to a significant degree to facilitate the assembling of the lower guide roller assembly 10.

Furthermore, the reduction in wall thickness of the guide roller 16 makes it possible to increase the volume of the oil reservoir 18 and to hold a greater amount of lubricant oil in the oil reservoir 18 for the purpose of improving lubricative effects on the ball bearings 15, guaranteeing smooth operations of the lower guide roller assembly 10 over a longer period of time.

Described below is a method for forming (by a bulging operation) the guide roller 16 of this embodiment, with reference to FIGS. 3 to 6.

Figure 3:
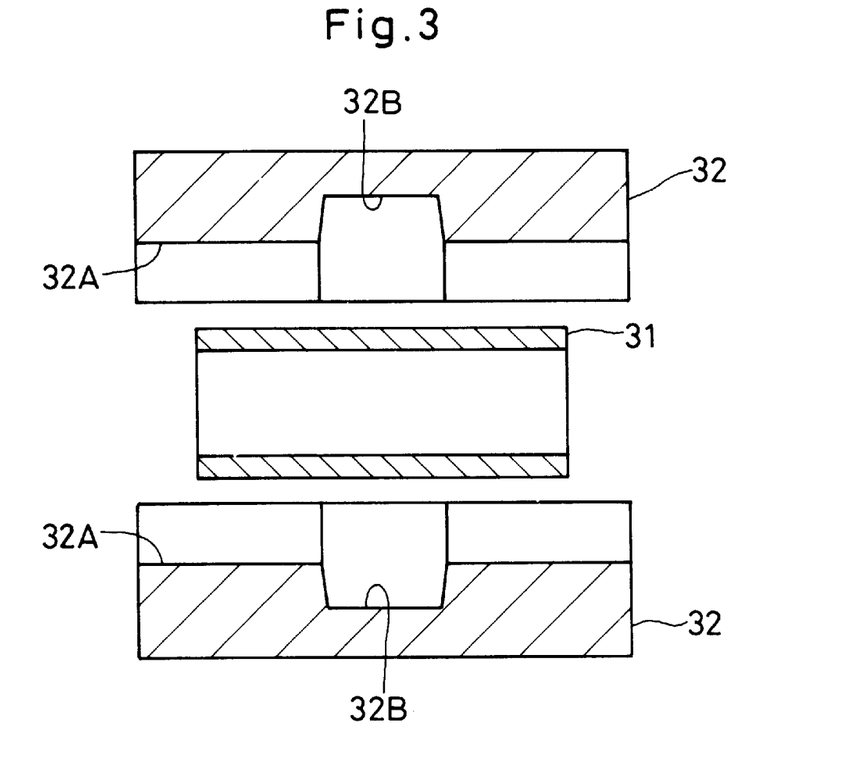
FIG. 3 is a vertical sectional view taken through a tubular material to be formed into a guide roller and a forming die.

Firstly, a tubular steel material to be formed into the guide roller 16, e.g., a carbon steel tube for machine structure (STKM material), structural manganese steel tube with specified hardenability bands (SMn steel material) or other carbon steel tube for machine structure (S45C, S40C & S35C), is cut into a predetermined unit length as shown particularly in FIG. 3.

According to the present invention, a pair of split dies 32 are used for forming the tubular steel material to shape as the guide roller 16, closing the dies 32 on the tubular steel material to clamp same from radially opposite directions. In this case, each one of the split dies 32 is provided with a cavity in the longitudiral direction, including a narrow semi-cylindrical recess 32A of a diameter corresponding to the outside diameter of the tubular steel material 31, and a wide semi-cylindrical recess 32B formed in a longitudinally intermediate portion of the narrow semi-cylindrical recess 32A and having a diameter corresponding to that of the radially bulged center portion 16B to be formed on the guide roller 16.

Figure 4:
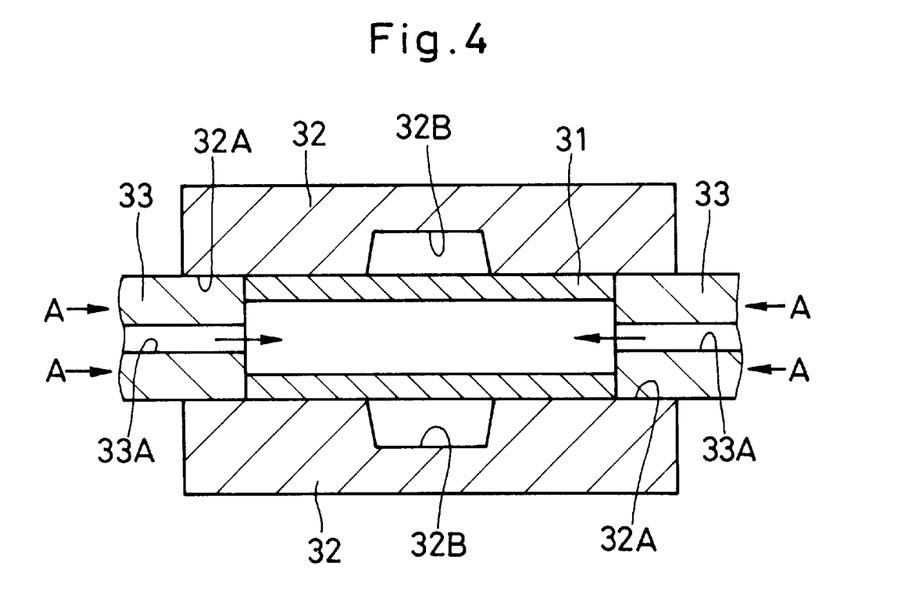
FIG. 4 is a vertical sectional view of the tubular material being clamped in the forming die.

Nextly, as shown in FIG. 4, after placing a longitudinally intermediate portion of the tubular steel material 31 in the above-mentioned wider semi-cylindrical recesses 32B, the split dies are closed toward each other to clamp the tubular steel material 31 from radially opposite directions. Then, a pair of force plungers 33 each with a center oil passage 33A are thrusted into the narrow semi-cylindrical recesses 32A through opposite ends of the closed split dies 32.

Figure 5:
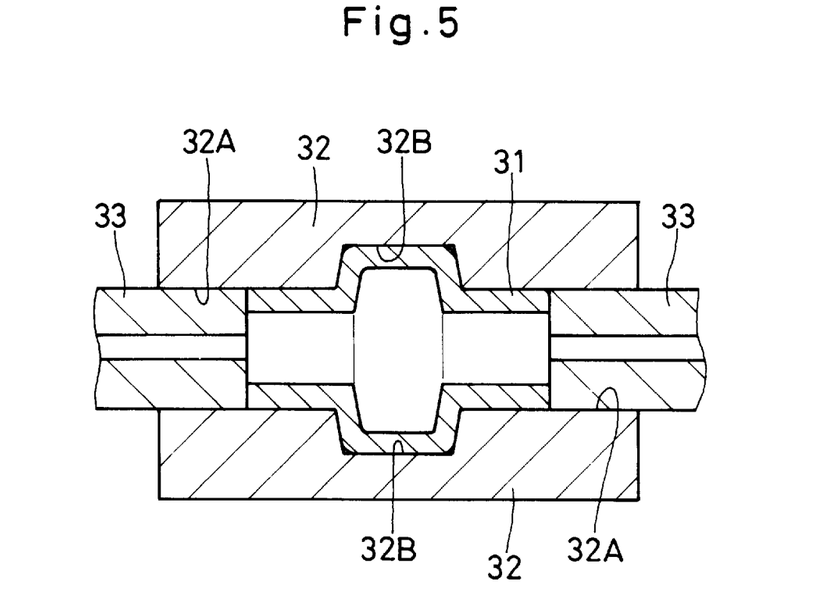
FIG. 5 is a vertical sectional view of the tubular material in the forming die after it has undergone plastic deformation.

In this state, a high pressure oil is introduced into the tubular steel material 31 through the center oil passages 33A of the respective force plungers 33 while driving the force plungers 33 toward each other (in the directions of arrows A) to compress the tubular steel material 31 in the axial direction. As a result, the tubular material 31 is bulged out in an axially intermediate portion, within the wider recesses 32B of the split dies 32, through plastic deformation (or plastic fluidization) as shown in FIG. 5.

Figure 6:
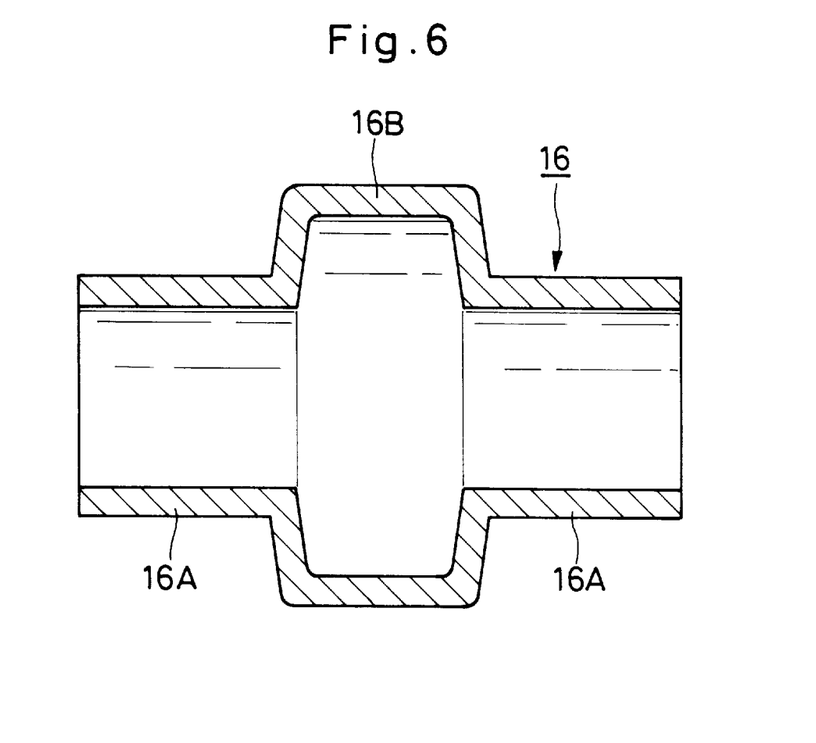
FIG. 6 is a vertical sectional view of the tubular material which has undergone plastic deformation.

Consequently, as shown in FIG. 6, by the above-described bulging operation, there can be produced a guide roller 16 of an integral unitary structure which is substantially uniform in wall thickness in its entirely, and which is formed with a radially bulged center portion 16B of a shape corresponding to the wider recesses 32B of the closed split dies 32, integrally between cylindrical end portions 16A of a diameter substantially corresponding to that of the starting tubular steel material 31.

Thereafter, opposite end faces of the radially bulged center portion 16B of the guide roller 16 as well as outer peripheral surfaces of the cylindrical end portions 16A are subjected to high frequency hardening treatment to form hardened surface layers thereon.

Thus, according to the guide roller forming method just described, a single tubular steel material 31 is cut into a predetermined unit length, and a high pressure is introduced into the tubular steel material 31 while compressing axially from opposite ends to form a bulged center portion 16B between cylindrical end portions 16A by cold working of the material.

This method according to the present invention contributes to make the roller forming process extremely simple, for example, by elimination of mechanical machining and welding operations which are essentially required in the conventional manufacturing processes of split type guide rollers which are each formed by welding and joining together a plural number of separately prepared roller parts or segments, and by elimination of a heating operation as required in conventional manufacturing processes for hot-forged roller bodies. Thus, the method of the present invention makes it possible to reduce the number of steps in the manufacturing process and to slim down the manufacturing facilities to realize marked reductions in production cost of the guide rollers.

Figure 7:
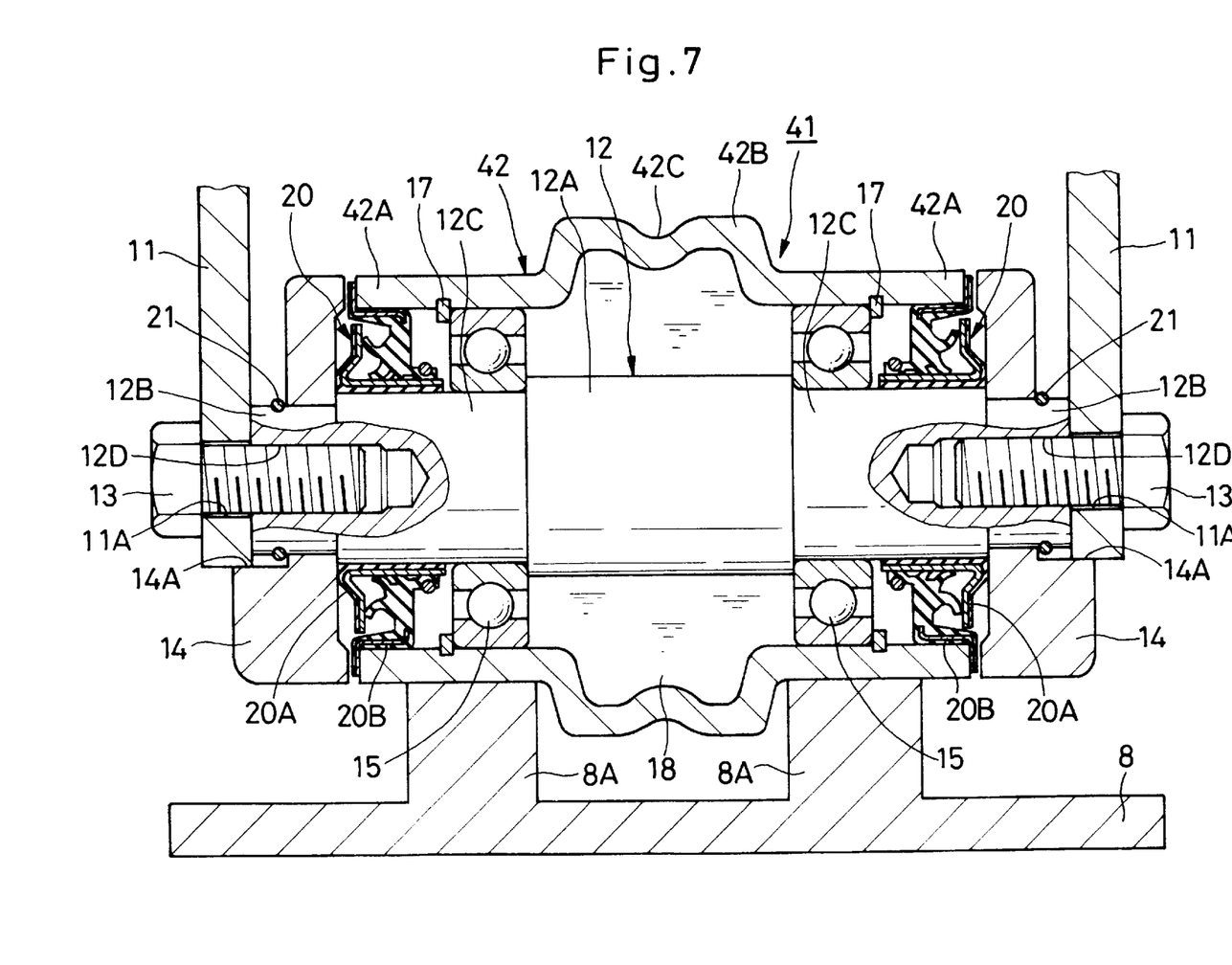
FIG. 7 is a vertical sectional view of a guide roller assembly according to a second embodiment of the invention.

Referring now to FIG. 7, there is shown a second embodiment of the crawler belt guide roller assembly according to the present invention, which is characterized in that an indented reinforcing groove is formed on and around the entire outer periphery of a bulged center portion of a guide roller. In the following description, those component parts which are common with the foregoing first embodiment are designated simply by common reference numerals or characters without repeating same explanations.

In FIG. 7, indicated at 41 is a lower guide roller assembly which basically includes support brackets 11, support shaft 12, ball bearings 15, seal members 20 and a guide roller 42 as will be described below.

The guide roller 42 of this embodiment is likewise provided with a pair of cylindrical end portions 42A in its longitudinally opposite end portions, and a radially bulged center portion 42B formed integrally between the cylindrical end portions 42A. Further, in this case, an indented reinforcing groove 42C is formed on and around the entire outer periphery of the bulged center portion 42B.

In this instance, the guide roller 42 similarly consists of a unitary structure of a stepped cylindrical shape having substantially uniform wall thickness over its entire length, the guide roller 42 being formed by bulging a tubular steel material of a unit length within split dies with cavity profiles corresponding to the cylindrical end portions 42A, the radially bulged center portion 42B and the annular indented groove 42C.

In this embodiment with the arrangements just described, the guide roller 42 consists of an integral unitary structure of a stepped cylindrical shape, free of partial weak spots as found in the conventional split type guide rollers which are formed by joining and welding together a plural number of separately roller parts or segments. On this point, there is no differences in particular from the foregoing first embodiment of the invention.

Besides, since the guide roller 42 is reinforced by the annular indented groove 42C, which is formed on and along the entire outer periphery of the radially bulged center portion 42B, it can ensure stable operations of the lower guide roller assembly 41 over an extended period of time.

Figure 8:
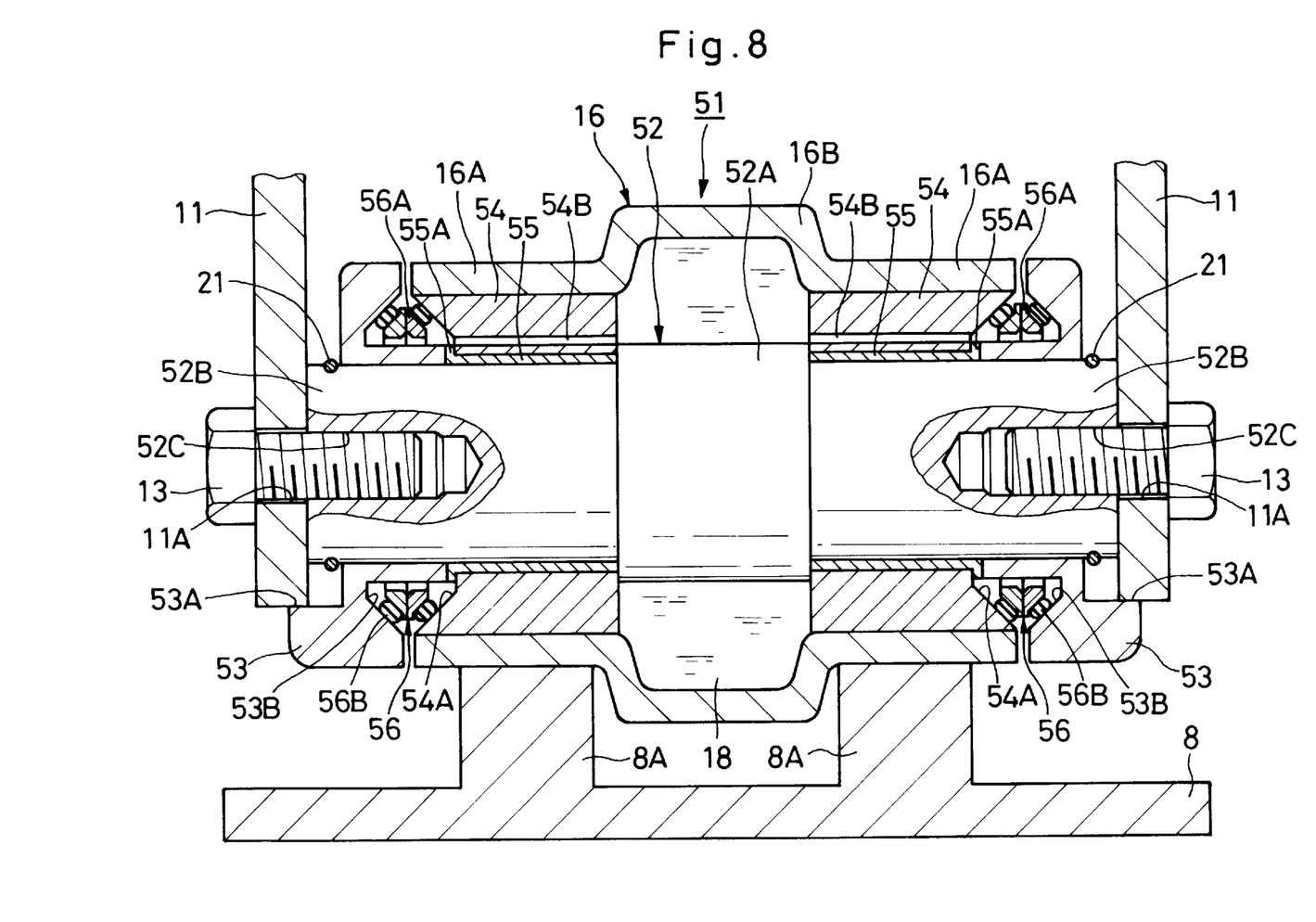
FIG. 8 is a vertical sectional view of a guide roller assembly which has been adopted as a third embodiment of the invention.

Turning now to FIG. 8, there is shown a third embodiment of the guide roller mechanism according to the present invention, characterized by a sleeve-like spacer which is fitted in the inner periphery of each cylindrical end portion of a guide roller, and a sleeve-like bush which is fitted in the inner periphery of the spacer member for sliding contact with surfaces on the outer periphery of the support shaft. In the following description, those component parts which are common with the foregoing embodiments are simply designated by common reference numerals or characters without repeating same explanations.

In FIG. 8, indicated at 51 is a lower guide roller assembly which basically includes support brackets 11, guide roller 16 and support shaft 52, along with spacer members 54, sleeve-like bushes 55 and floating seals 56, which will be described in greater detail below.

Indicated at 52 is the support shaft 52 which is fixedly mounted on and between right and left support brackets 11 through mounting belts 13. The support shaft 52 includes a larger diameter portion 52A which is located in its axially intermediate position, and bearing fitting portions 52B which are located at its opposite axial ends and provided with tapped holes 52C in the respective end faces to receive mounting bolts 13.

Denoted at 53 are support collars which are fitted on the bearing fitting portions 52B on the inner side of the right and left brackets 11, respectively. Lower ends of these support collars 53 are extended toward the right and left support brackets 11 to form load bearing portions 53A which support lower ends of the respective support brackets 11. Further, the support collars 53 are each formed with a seal receptacle recess 53B to receive a floating seal 56 therein.

Indicated at 54 are sleeve-like spacer members which are forcibly fitted in the inner periphery of the respective cylindrical end portions 16A of the guide roller 16. These spacer members 54 serve as a support for bushes 55 which will be described after. Formed in the end faces at the opposite axial ends of the spacers 54 are tapered seal receptacle recesses 54A each having inwardly converging walls which are gradually reduced in diameter in the inward direction. Further, each spacer 54 is bored with an axial oil passage 54B on the inner peripheral side to communicate an oil reservoir 18 in the radially bulged center portion 16B of the guide roller 16 with the seal receptacle recess 54A. Accordingly, the lubricant oil in the oil reservoir 18 is supplied through the oil passages 54B of the respective spacers 54 to sliding surfaces of the support shaft 52 and bushes 55 as well as to sliding surfaces of the floating seals 56.

The bushes 55 which serve as plain bearings are formed in a cylindrical shape, for example, by the use of a lead bronze type metallic material. Each bush 55 is provided with a flange 55A at an outer end thereof, and forcibly fitted in the inner periphery of the spacer 54, with sliding surfaces on its inner periphery in sliding contact with the support shaft 52. Further, each one of the sleeve-like bushes 55 is retained in position by and between the larger diameter portion 52A of the support shaft 52 and inner end face of the support collar 53.

The floating seals 56, which are nested within the seal receptacle recesses 53B and 54A on the support collar 53 and the spacer 54, are each constituted by a pair of seal rings 56A and a pair of seal O-rings 56B which are held in sliding contact with each other. The paired seal rings 56A of the floating seal 56 are constantly held in sliding contact with each other to prevent the lubricant oil in the oil reservoir 18 from leaking out through the opposite ends of the guide roller 16 and at the same time to block intrusion of dirt through the opposite ends of the guide roller 16.

This embodiment, with the arrangements just described, can produce the same effects as mentioned in the foregoing embodiments. Especially in this case, however, the respective cylindrical end portions of the guide roller 16 are reinforced from inside by the spacers 54 which are fitted in the inner peripheries of the cylindrical end portions 16A of the guide roller 16 and also by the sleeve-like bushes 55 which are fitted in the inner peripheries of the respective spacers 54. Consequently, this embodiment contributes to prolong the service life of the guide roller 16 and to ensure stable operations of the lower guide roller assembly 51 over an extended period of time.

Figure 9:
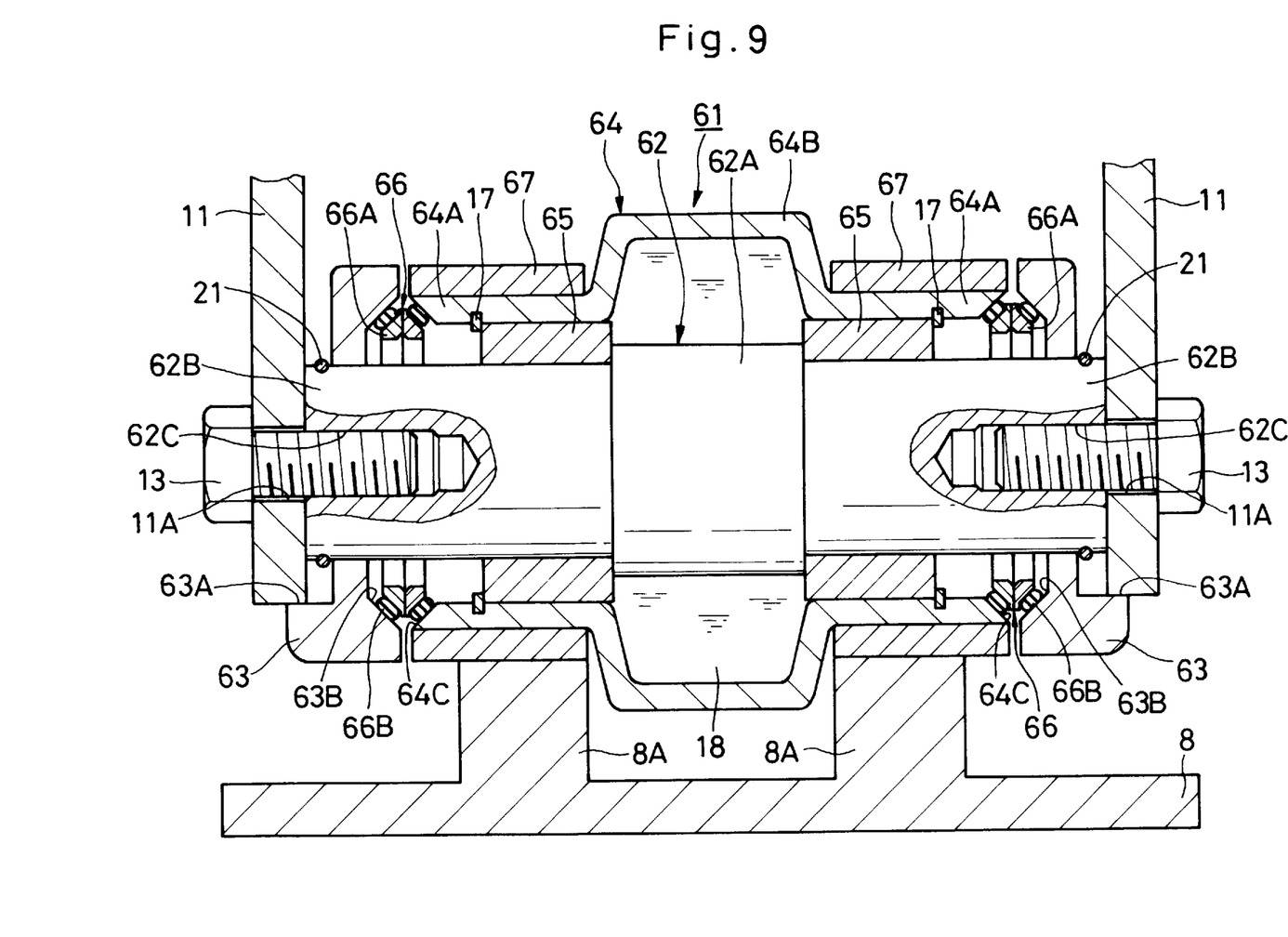
FIG. 9 is a vertical sectional view of a guide roller assembly which has been adopted as a fourth embodiment of the invention.

Referring now to FIG. 9, there is shown a fourth embodiment of the invention, which is characterized by the provision of reinforcing sleeves which are fitted on the outer peripheries of cylindrical end portions of a roller body. In the following description of the fourth embodiment, those component parts which are common with the foregoing embodiments are simply designated by common reference numerals or characters to avoid repetitions of same explanations.

In FIG. 9, designated at 61 is a lower guide roller assembly which basically includes support brackets 11, support shaft 62, guide roller 64, sleeve-like bushes 65, floating seals 66, and sleeve-like reinforcing members 67.

Indicated at 62 is the support shaft 62 which is fixedly mounted on and between the right and left support brackets 11 through the mounting bolts 13, and provided with a large diameter portion 62A in an axially intermediate portion between bearing fitting portions 62B which are located at the axially opposite ends of the support shaft 62. Screw holes 62C are tapped into the opposite end faces of the support shaft 62 to receive the mounting bolts 13.

Denoted at 63 are the support collars which are fitted on the bearing fitting portions 62B of the support shaft 62 on the inner side of the right and left support brackets 11. Lower ends of the support collars 63 are extended outward or toward the support brackets 11 to form load bearing portions 63A which support lower ends of the respective brackets 11. Seal receptacle recesses 63B are formed on the inner end faces of the support collars 63 to accommodate floating seals 66 therein.

The guide roller 64 is rotatably mounted between the right and left support brackets 11 through sleeve-like bushes 65 which will be described hereinafter. The guide roller 64 is provided with a pair of cylindrical end portions 64A in its axially opposite end portions, and a radially bulged center portion 64B which is formed between the cylindrical end portions 64A. This guide roller 64 consists of an integral unitary structure of a stepped cylindrical shape and having substantially uniform wall thickness along the entire length thereof, formed similarly by bulging a tubular steel material of a predetermined unit length in split dies with cavity profiles corresponding to the above-mentioned cylindrical end portions 64A and the bulged center portion 64B. Formed into the opposite end faces of the guide roller 64 are tapered recesses 64C which are each gradually reduced in diameter in the inward direction to retain the floating seal 66, which will be described hereinafter, in cooperation with the opposing seal receptacle recess 63B of the opposing support collar 63.

Indicated at 65 are the sleeve-like bushes which are each formed in a cylindrical shape as a bearing and made, for example, of high tension brass material impregnated with solid lubricant or sintered oil-containing alloy material. Each bush 65 is forcibly fitted in the inner periphery of the guide roller 64, with sliding surfaces on its inner periphery in sliding contact with the support shaft 62. Further, each sleeve-like bush 65 is retained in position on the support shaft by and between an end face of the larger diameter portion 62A of the support shaft 62 and a stopper ring 17.

The floating seals 66, each nested between the seal receptacle recess 63B of the support collar 63 and the inwardly tapered end face 64C of the guide roller 64, are constituted by a pair of seal rings 66A and a pair of O-rings 66B which are held in sliding contact with each other.

Indicated at 67 are reinforcing sleeves which are forcibly fitted on the cylindrical end portions 64A of the guide roller 64. The reinforcing sleeves 67 are so arranged as to cover the entire outer peripheries of the cylindrical end portions 64A, and, instead of the cylindrical end portions 64A, to run on and along the ridges 8A of the crawler belt 8.

This embodiment, with the arrangements as described above, can produce substantially the same effects as in the foregoing embodiments. However, in the case of this particular embodiment having the reinforcing sleeves 67 fitted on the outer peripheries of the cylindrical end portions 64A of the guide roller 64, it becomes possible to prevent cracking or similar damages which would otherwise occur to the guide roller 64 as a result of direct collisions against the crawler belt 8. As a consequence, the guide roller 64 can ensure a prolonged service life to guarantee stable operations of the lower guide roller mechanism 61 over an extended period of time all the more.

Although the guide roller assembly of the invention has been described by way of a lower guide roller mechanism in the foregoing embodiments, it is to be understood that it can be similarly applied, for example, to an upper guide roller mechanism of a crawler type vehicle.

Further, the present invention can be widely applied to guide roller assembly of crawler type vehicles other than the hydraulic power shovel, which has been shown as a typical example of crawler type vehicles in the foregoing embodiments. For instance, the invention is applicable to guide roller mechanisms of hydraulic cranes or other crawler type vehicles.

As clear from the foregoing particular description, according to the present invention, there is provided a guide roller particularly suitable for use on a guide roller mechanism of a crawler type vehicle for guiding a crawler belt, the guide roller being constituted by an integral unitary structure of a stepped cylindrical shapes having a radially bulged portion formed integrally in its axially intermediate portion through plastic deformation. This roller construction contributes to simplify the manufacturing process and to cut the production cost of guide rollers by elimination of mechanical machining and welding operations which have thus far been essentially required in the case of split type guide rollers which are fabricated by joining and welding together a plural number of roller parts.

In addition, as compared with guide rollers which contain locally weak spots in joined or welded portions, the guide roller construction according to the present invention is improved in strength of the guide roller as a whole, by elimination of locally weak spots and by the radially bulged center portion.

Furthermore, according to the present invention, the radially bulged center portion and cylindrical end portions are integrally formed on a single guide roller by cold working. It follows that the guide roller can be produced from a relatively thin tubular material to provide a roller structure which is compact and light weight of guide roller and yet which is thin enough in wall thickness to accommodate rolling bearings like ball bearings to ensure smooth rotations of the guide roller about the support shaft.

What is claimed is:

1. A guide roller assembly for crawler type vehicle, having a truck frame, a support shaft fixedly mounted on the truck frame, and a guide roller rotatably fitted on the circumference of said support shaft through a pair of bearings to guide movements of a running crawler belt, said guide roller comprising:

an integral unitary body structure of a stepped cylindrical share having a pair of cylindrical end portions formed in axially opposite end portions thereof and accommodating bearings on the inner peripheral side thereof, and a radially bulged center portion formed integrally in an axially intermediate portion between said cylindrical end portions, wherein said guide roller is formed substantially in uniform thickness by a bulging operation throughout said integral unitary body structure including said cylindrical end portions and said radially bulged center portion, and wherein said bearings are each constituted by a sleeve-like spacer member fitted in the inner periphery of one cylindrical end portion of said guide roller, and a sleeve-like bush fitted between and in sliding contact with the inner periphery of said spacer member and the outer periphery of said support shaft.

2. A guide roller assembly as defined in claim 1, further comprising a sleeve-like reinforcing member fitted on the outer periphery of each cylindrical end portion of said guide roller.

3. A guide roller assembly for crawler type vehicle, having a truck frame, a support shaft fixedly mounted on the truck frame, and a guide roller rotatable fitted on the circumference of said support shaft through a pair of bearings to guide movements of a running crawler belt, said guide roller comprising:

an integral unitary body structure of a stepped cylindrical shape having a pair of cylindrical end portions formed in axially opposite end portions thereof and accommodating bearings on the inner peripheral side thereof, and a radially bulged center portion formed integrally in an axially intermediate portion between said cylindrical end portions, wherein said guide roller is formed substantially in uniform thickness by a bulging operation throughout said integral unitary body structure including said cylindrical end portions and said radially bulged center portion, and further comprising an indented reinforcing groove formed on and around the entire outer periphery of said bulged center portion.

4. A guide roller assembly for guiding a running crawler belt for a crawler type vehicle comprising:

a support shaft;

a guide roller coaxial with said support shaft; and bearings rotatable supporting said guide roller on said support shaft;

wherein said guide roller comprises an integral unitary body structure of a stepped cylindrical shape having a pair of cylindrical end portions formed in axially opposite end portions thereof and accommodating bearings on the inner peripheral side thereof, and a radially bulged center portion formed integrally in an axially intermediate portion between said cylindrical end portions, wherein said guide roller is formed substantially in uniform thickness by a bulging operation throughout said integral unitary body structure including said cylindrical end portions and said radially bulged center portion and, wherein said bearings are each constituted by a sleeve-like spacer member fitted in the inner periphery of one cylindrical end portion of said guide roller, and a sleeve-like bush fitted between and in sliding contact with the inner periphery of said spacer member and the outer periphery of said support shaft.

5. A guide roller assembly as defined in claim 4, further comprising a sleeve-like reinforcing member fitted on the outer periphery of each cylindrical end portion of said guide roller.

6. A guide roller assembly, for guiding a running crawler belt for a crawler type vehicle, comprising:

a support shaft;

a guide roller coaxial with said support shaft; and bearings rotatable supporting said guide roller on said support shaft;

wherein said guide roller comprises an integral unitary body structure of a stepped cylindrical shape having a pair of cylindrical end portions formed in axially opposite end portions thereof and accommodating bearings on the inner peripheral side thereof, and a radially bulged center portion formed integrally in an axially intermediate portion between said cylindrical end portions, wherein said guide roller is formed substantially in uniform thickness by a bulging operation throughout said integral unitary body structure including said cylindrical end portions and said radially bulged center portion, and wherein an indented reinforcing groove is formed on and around the entire outer periphery of said radially bulged center portion.

* * * * *